No. 780,745. PATENTED JAN. 24, 1905.
O. C. FORTNEY.
MILK COOLER.
APPLICATION FILED MAR. 25, 1904.

Witnesses:
K. H. Butten,
E. E. Potter.

Inventor
O. C. Fortney,
By
Attorneys

No. 780,745. Patented January 24, 1905.

UNITED STATES PATENT OFFICE.

OLIVER C. FORTNEY, OF PITTSBURG, PENNSYLVANIA.

MILK-COOLER.

SPECIFICATION forming part of Letters Patent No. 780,745, dated January 24, 1905.

Application filed March 25, 1904. Serial No. 199,909.

*To all whom it may concern:*

Be it known that I, OLIVER C. FORTNEY, a citizen of the United States of America, residing at Pittsburg, in the county of Allegheny and State of Pennsylvania, have invented certain new and useful Improvements in Milk-Coolers, of which the following is a specification, reference being had therein to the accompanying drawings.

This invention has relation to aerators and coolers; and the object of this invention is to provide a cooler of this type wherein a greater cooling-surface is provided for the fluid to be cooled and a circuitous path is provided for the fluid, whereby a greater amount of cooled surface is covered by the fluid during its passage upon the aerator or cooler.

Another object of my invention is to provide novel means whereby a liquid, such as milk, may be cooled to any desired temperature to effectually remove the animal heat, germs, or other foreign matter therefrom.

Briefly described, my invention comprises a double cone-shaped casing having a spiral path upon its exterior surface in which the fluid travels, and in this double cone-shaped casing is placed the cooling agent, whereby the outer shell of the cone-shaped casing will at all times during the operation of the cooler be maintained in a cooled state.

With the above and other objects in view reference will be had to the drawings accompanying this application, wherein like numerals of reference indicate like parts throughout both views, in which—

Figure 1:
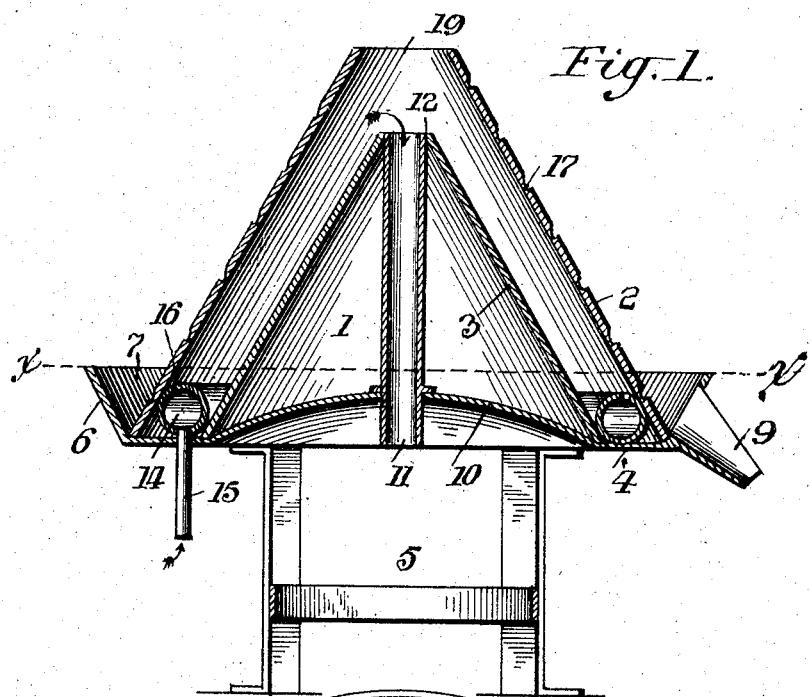
Figure 2:
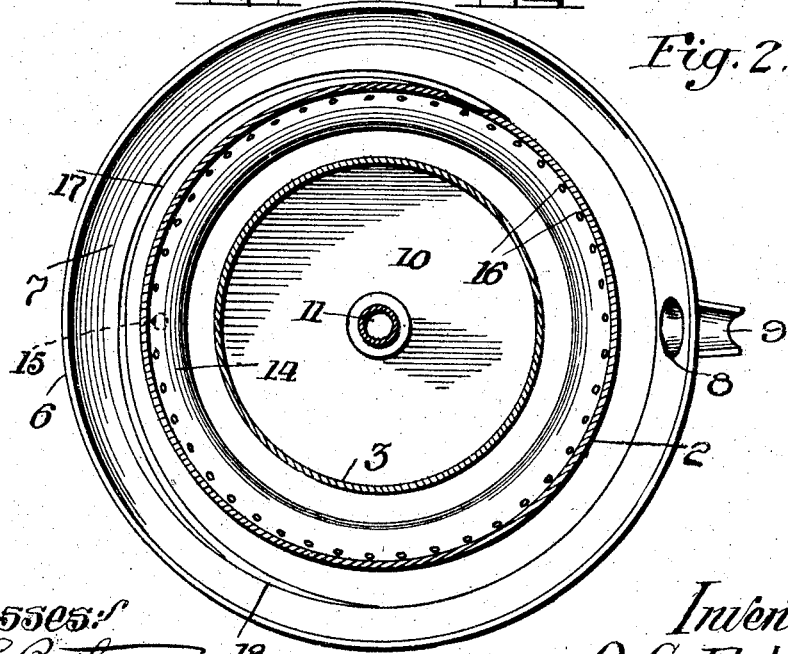

Figure 1 is a vertical sectional view of my improved cooler, and Fig. 2 is a horizontal sectional view taken on the line *x x* of Fig. 1.

Referring to the accompanying drawings, the reference-numeral 1 indicates the frustrated cone-shaped casing of my improved cooler, this casing comprising an outer shell 2 and an inner shell 3, both of these shells being supported by and secured to a base 4. This base 4 is supported upon a suitable stand 5, and the base has its outer edge flanged, as indicated at 6, forming an annular recess or trough 7 between the shell 2 and the annular flange 6. In this flange is provided an opening 8, in which is fitted a suitable spout 9, whereby the contents of said recess or trough may be carried off to a suitable receptacle to collect the same. The central portion of the base 4 is bent inwardly, forming a concave bottom 10, and mounted centrally in the inner shell 3 and passing through the concave bottom 10 is an overflow-pipe 11, to the lower end of which may be secured a hose or any other suitable pipe (not shown) for conveying the overflow therefrom. The upper end of the pipe 11 is secured in the opening 12, formed by the frustration of the inner cone-shaped shell 3.

Between the outer shell 2 and the inner shell and located upon the base 4 of the cooler is a circular pipe 14, which has a suitable inlet-pipe 15, and the upper face of this circular pipe 14 is provided with a plurality of apertures 16, said apertures being formed in said pipe in such a manner that the contents thereof will be directed toward the outer shell 2.

In the outer surface of the shell 2 I provide a spiral path 17, the lower end of this spiral path entering the bottom of the recess 7, as designated by the reference-numeral 18, whereby if a fluid was fed in the upper end of the spiral path the fluid would be caused to travel around the same to the recess 7, formed by the flange 6 and the outer shell.

By frustrating the outer cone-shaped shell 2 an opening 19 is formed, through which is adapted to be placed the cooling agent which will lie between the inner and outer shells, and I preferably use ice for this purpose, and by filling the space between the inner and outer shell with ice and emitting water to the same through the opening 16 of the circular pipe 14 the outer shell 2 will be maintained in a cooled state, whereby the liquid flowing over the same will be cooled to that degree of temperature that all germs and other foreign ingredients and animal heat will be removed.

While I have not shown any means for feeding the liquid upon the cone-shaped casing, I wish it to be understood that any desired means may be employed, such as a receptacle lowered above the cone-shaped casing, wherefrom the milk may be fed to the surface of the casing and pass along the spiral path 17 into the recess 7, from whence it would pass through the spout 9 to a suitable receptacle.

It may be noted that various slight changes may be made in the details of construction without departing from the general spirit and scope of the invention.

Having fully described my invention, what I claim is—

In an apparatus of the type described, the combination of an inner and outer conical shell, a base on which said shells are supported, the base having a flange forming a trough at the base of the outer shell, an overflow-pipe fitting in the upper end of the inner shell, an annular liquid-discharge pipe arranged on the base between the inner and outer shell and having a row of perforations arranged to discharge water against the outer shell.

In testimony whereof I affix my signature in the presence of two witnesses.

OLIVER C. FORTNEY.

Witnesses:
H. C. EVERT,
E. E. POTTER.